C. O. NORMAN.
AUTOMOBILE CURTAIN.
APPLICATION FILED MAR. 6, 1919.
1,317,937.
Patented Oct. 7, 1919.
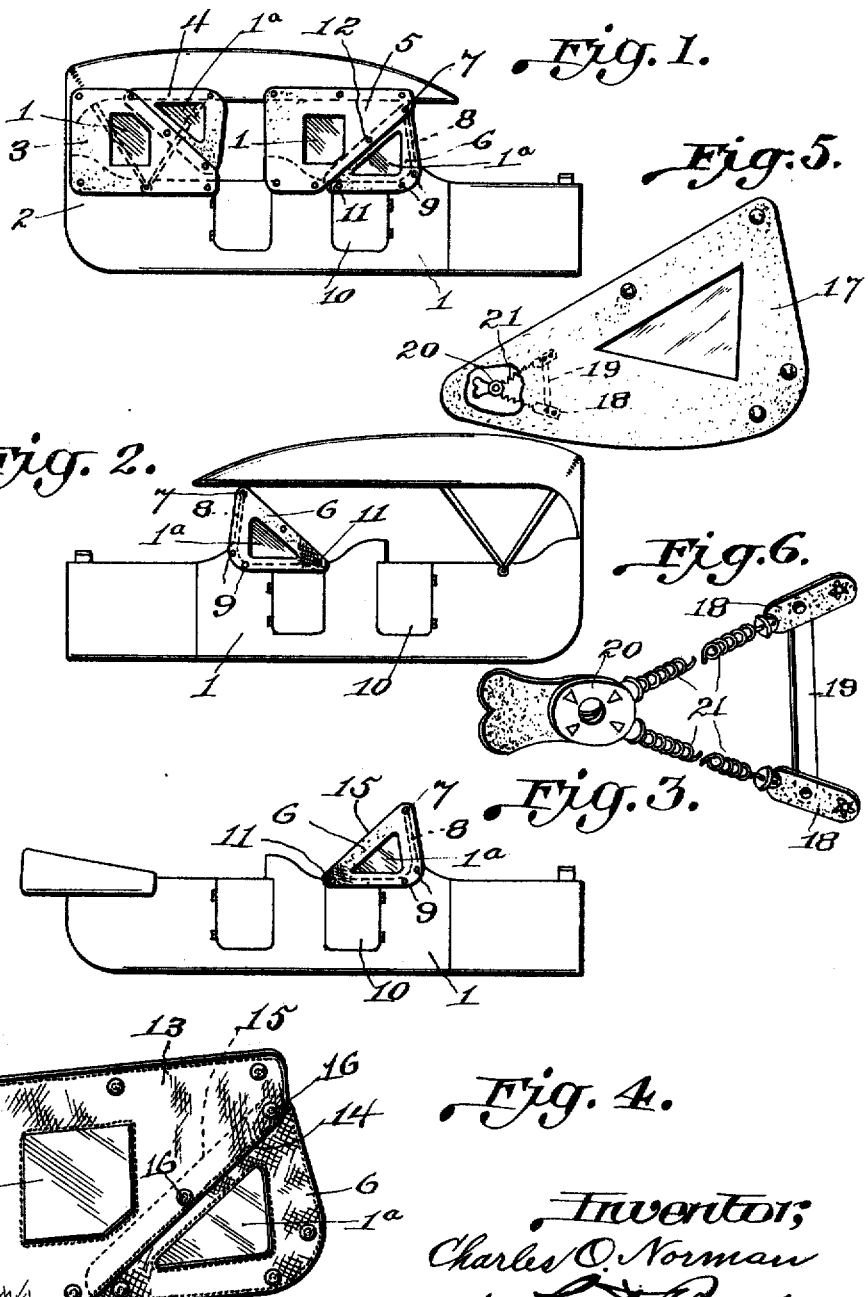

UNITED STATES PATENT OFFICE.

CHARLES O. NORMAN, OF MONTGOMERY, ALABAMA.

AUTOMOBILE-CURTAIN.

1,317,937.  Specification of Letters Patent.  Patented Oct. 7, 1919.

Application filed March 6, 1919. Serial No. 280,988.

*To all whom it may concern:*

Be it known that I, CHARLES O. NORMAN, a citizen of the United States, residing at Montgomery, in the county of Montgomery and State of Alabama, have invented certain new and useful Improvements in Automobile-Curtains, of which the following is a specification.

This invention relates to vehicle curtains and pertains especially to automobile curtains.

The object of the invention is to provide a wind guard end curtain of such novel and peculiar shape or construction as to permit ordinary side curtains to be attached thereto and detached therefrom without detaching or removing the said curtain for open and closed positions of an automobile.

A further object of the invention is to provide a curtain attachable to or connected with the wind guard frame of an automobile for permitting the top of the automobile to be used in both open and closed positions without detaching or displacing the curtain.

Various other objects, advantages and improved results are attainable in the practical application of the invention.

In the accompanying drawings forming part of this application:

Figure 1 is a side view of an automobile body showing the application of the invention to an automobile body with curtains as in closed position.

Fig. 2 is a similar view showing the automobile top in the same position with only the guard curtain remaining in proper position.

Fig. 3 is a side elevation of an open automobile body showing unchanged position of said curtain with the top lowered.

Fig. 4 is a perspective view of a two-part separable curtain embodying my invention.

Fig. 5 is a side view of a curtain showing an expansible fastener.

Fig. 6 is a perspective view of this fastener partly broken away.

The same reference characters denote the same parts throughout the several views of the drawings.

It is well known that the eddying of air currents around the ends of unprotected wind guards and shields is highly objectionable, that such ends as are usually covered or partially so by ordinary curtains hung from the top of an automobile and attached to the sides of a car, necessitate detaching and removing for an entrance and exit and for operating the car top to and from open and closed positions, but according to my invention such objections and disadvantages are overcome, and after my guard curtain has been fitted and placed in position it is not necessary or intended to be detached or removed, and performs the same function whether the car is opened or closed and whether the top is in raised or lowered position, nor is it necessary to remove or detach the same for opening and closing the front door.

In carrying out my invention any suitable material of which ordinary automobile curtains are composed may be employed, having a transparent portion 1. Referring to Fig. 1 of the drawings, my improved curtains are shown as partially inclosing the sides of an automobile body 2. The rear side curtain 3 has attached thereto my curtain 4 which is preferably triangular shaped, and which may be removed and replaced without detaching or removing the curtain 3. The forward curtain 5 shown in Fig. 1, may be detached, removed and replaced without detaching or removing my guard curtain 6, which is substantially the same as the curtain 4 applied in reversed position. The curtain 6, as shown in Figs. 2 and 3 of the drawings, and which I call wind guard end curtains, is attached as at 7 to a wind guard frame as 8, and to the body 2 adjacent said frame as at 9, and to the door 10 as at 11, and extends rearwardly from the wind guard so as to cover the opening usually left by some ordinary curtains, which may be attached to the inclined edge of my curtain 6 as at 12. Or where such ordinary curtains which are hung from the top of a car and cover said openings and which necessitates detaching the same from the car body, such ordinary curtains may be cut or shaped as desired or as various cars may demand in a complete article of manufacture as a two-part curtain, as clearly shown in Fig. 4 of the drawings, wherein the detachable curtain section 13 has an inclined edge 14 corresponding with the inclined edge 15 of the guard curtain, and said edges overlap and are joined by buttons or fastening clasps 16.

While only one square window is shown in the detachable curtains, and a triangular window 1ª is shown in the guard curtains, the said windows may be multiplied and of various shapes as desired or as occasion may demand for automobiles of various types, and while I have shown the guard curtain applied to an inclined guard frame, this curtain may be shaped and fitted to guard frames of various types, and may be of various dimensions and shapes so as to cover the space between such frame ends and the top edge of the car body.

It will be seen that after the guard curtain is once fitted and attached in position it may remain so without adjustment, and that its shape and connection with the guard frame and car body and door permits the latter to be opened and closed, and the car top to be shifted and changed, and the side curtains to be attached and detached without detaching the guard curtains which are intended as a fixture, and does not obstruct view, precludes wind, rain and dust, and protects driver and passengers.

Obviously, suitable and necessary changes may be made in the manufacture and practical utility of these curtains and in the method or manner of applying and attaching them, so as to afford especially a wind guard curtain fixed independent of a car top and of any other curtain or curtains. Therefore I do not wish to be understood as confining my invention in scope inconsistent with the claims to follow.

In order to provide for the difference in width and location of such doors with respect to the guard frame, I attach a pair of tabs 18 to the inner side of the curtain as 17 so as to leave a free flap member. The tabs secure one end of a pair of resilient fastenings or springs 21, to the curtain, and the other ends of the springs are attached to a plate 19 for a door clasp 20, so as to permit the springs to be expanded and contracted lengthwise the curtain for having the flap member overlap the free edge of the door.

Having thus described my invention what I claim as new and desire to secure by Letters Patent is:

1. In a wind guard attachment for automobiles, a curtain having its front edge attached to the guard frame and extending downwardly and rearwardly over the upper portion of the front door of an automobile, and a flexible fastening device attached to the curtain so as to leave a free flap curtain member, said fastening being expansible lengthwise of the curtain and adapted to be attached to the automobile door and movable with the door in opening and closing the door.

2. In a wind guard attachment for automobiles, a curtain having its front edge attached adjacent to the ends of the guard and extending rearwardly over the upper portion of the automobile door, and an expansible device comprising a pair of elastic members having one end attached to the inner side of the curtain so as to leave a free curtain flap, the other end of said members being free of the curtain and having a fastening for attaching to the door.

In witness whereof I hereunto set my hand in the presence of two witnesses.

CHARLES O. NORMAN.

Witnesses:
A. W. CHAMBLESS,
DENNIS LINEHAN.

Copies of this patent may be obtained for five cents each, by addressing the "Commissioner of Patents, Washington, D. C."